RELATIONSHIP BETWEEN FIRST-STAGE REFORMING
INTENSITY AND FEED STOCK QUALITY

OCTANE LEVEL AT WHICH THE
COMBINATION PROCESS BECOMES ATTRACTIVE

INVENTORS:
William W. Sanders
Robert J. Hengstebeck
BY Michael Dufresy
ATTORNEY

United States Patent Office 2,938,854
Patented May 31, 1960

2,938,854

COMBINATION CATALYTIC AND THERMAL REFORMING PROCESS

William W. Sanders, Crete, Ill., and Robert J. Hengstebeck, Valparaiso, Ind., assignors to Standard Oil Company, Chicago, Ill., a corporation of Indiana Filed Feb. 28, 1957, Ser. No. 643,021

3 Claims. (Cl. 208—65)

This invention relates to the reforming of naphthas. More particularly, the invention relates to a more economic reforming process for the production of gasoline range reformate approaching 100 octane number, research, clear.

The octane demand of the latest automotive engines is so high that refiners are having difficulty in producing gasoline suitable for these engines at economic prices. The product of the catalytic reforming of naphthas is the main stay of refiners in their fulfillment of octane demand. Now that a greater and greater number of automotive engines are requiring gasolines having octane number, research, of about 100 even catalytic reforming is reaching an economic stop-out. It is necessary to produce a catalytic reformate having an octane number in excess of that of the commercial gasoline in order to balance out the components whose octane numbers are lower than the commercial gasoline requirements and which are needed to meet the sales volume. In order to meet this demand catalytic reformate must be on an octane number, research, clear approaching 100 or even in excess of 100.

In order to meet the octane demand catalytic reformers must be operated at high severity or expedients devised wihch permit reforming at lower intensity; one example of such an expedient is the so-called Rexforming Process. In the case of refiners utilizing regenerative platinum reformers such as ultraformers, powerformers, Houdriformers and Sinclair-Baker reformers, operation at high severity results in a more frequent regeneration requirement and also more frequent reactivations because the high severity greatly increases the rate of catalyst deactivation. It is also thought that very high severities have an adverse effect on catalyst life. In addition to the effects on catalyst high severity operation sharply decreases the yield of reformate by increasing the amount of gas and butane produced.

An object of the invention is a process utilizing regenerative platinum reforming to produce more economically total gasoline range reformate in the region of 100 octane number, research, clear and above. Another object is a process utilizing regenerative platinum reforming which involves fairly moderate conditions of catalytic reforming to produce total gasoline range reformate in the region of 100 octane number, research, clear and above. Other objects will become apparent in the course of the detailed description.

The following figures annexed hereto form a part of this disclosure.

Figure 1:
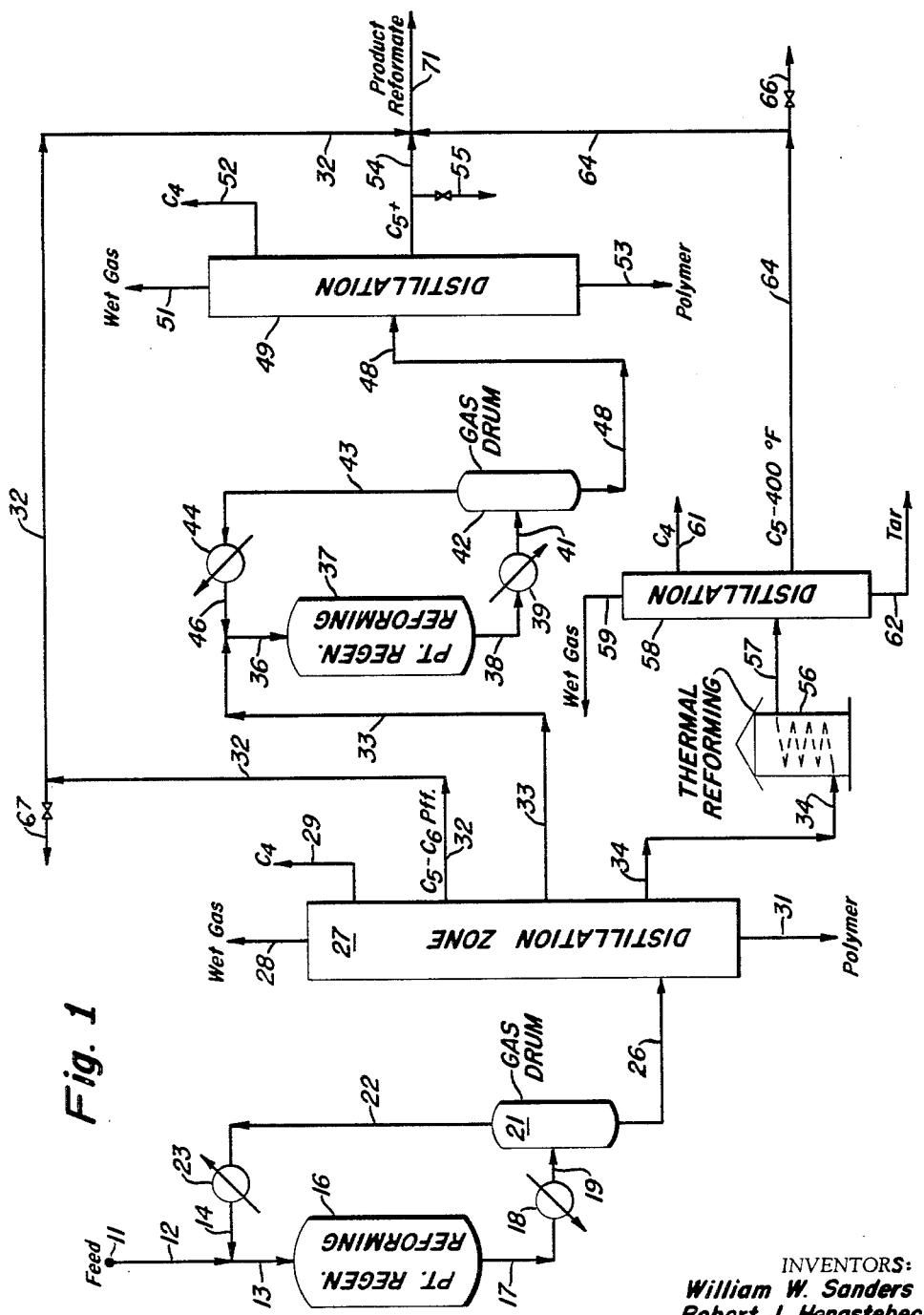
Figure 1 represents one embodiment of the combination process of the invention.

The combination process of the invention is described in connection with Figure 1. It is to be understod that the various operations set out in Figure 1 are well known commercial operations and the depiction in Figure 1 is therefor entirely schematic. Only sufficient detail has been introduced to permit easy visualization of the indivudual operations forming the combination process.

In Figure 1 feed stock (charge naphtha) from source 11 is passed by way of line 12 into line 13. It is to be understood that the charge naphtha would be brought to about the proper temperature for introduction into the reactor prior to entry thereto. Recycle gas comprising principally hydrogen is introduced from line 14 and joins the feed naphtha in line 13 and the combined stream passes into a platinum regenerative reforming operation depicted as zone 16. This reforming operation utilizes platinum catalyst on a support such as alumina. The catalyst may be only platinum or it may be promoted by one of the well known promoters such as chlorine or fluorine. The platinum catalyst utilized herein is entirely conventional and does not need to be descibed in detail. (For details on platinum catalyst suitable for use in the process reference is made to "Petroleum Refiner," volume 34, No. 9, page 240, September, 1955.)

The conditions at which the "first stage" reforming operation is carried out is determined by the octane number to which it is desired to reform and also the quality of the charge naphtha. In this description the quality of the charge naphtha is described by the use of the well known Watson Characterization Factor, $K_w$. The Watson Factor of the charge naphtha is determined by the use of one of the characters set out by Watson et al. Ind. Eng. Chem. 27, 1460 (1935). Hereinafter this factor is spoken of as the Watson Factor of the charge naphtha. The combination process of the invention is particularly applicable to charge naphthas (feed stock) having a Watson Factor between about 11.5 and 12.1. To illustrate a typical naphtha derived from mixture of Oklahoma and Texas crudes of the so called mixed base type has a Watson Factor of about 11.9. In general, the combination process is particularly attractive when the charge naphtha boils within the ASTM boiling range of about 175° F. and 390° F. and has a Watson Factor between about 11.8 and 12.0.

The conditions under which the regenerative platinum reforming is carried out are well known to the art. The relationship of the various operating conditions is presented in some detail in Ultraforming—New Reforming Process, "Petroleum Refiner," volume 33, No. 4, pages 153–156, April, 1954.

The total effluent from the reforming reactors is withdrawn by way of line 17 through heat exchange 18 and line 19 into gas drum 21. In gas drum 21 the hydrogen and some of the noncondensible gases are separated from the liquid product and are recycled by way of line 22, heater 23 and line 14 to line 13.

The liquid product is withdrawn from gas drum 21 by way of line 26 and passed to distillation zone 27. Distillation zone 27 is shown as a simple block even though it will ordinarily consist of a number of fractional distillation towers. From the distillation zone 27 a wet gas stream comprising mainly noncondensible gases and propane is withdrawn by way of line 28. A $C_4$ stream consisting essentially of butanes is shown as being withdrawn by way of line 29. It is customary to eliminate all the material boiling above about 400° F. as a so called polymer bottoms. The polymer is shown as being withdrawn by way of line 31 from distillation zone 27.

In the combination process of this invention the liquid hydrocarbon product of reforming from the first reforming operation is split into three fractions which cover the total boiling range extending from $C_5$ paraffins through to about 400° F. This combined liquid product is generally known as the $C_5+$ reformate product. The yields shown in the art are either on the basis of $C_5+$ reformate or have been adjusted to 10 lb. R.V.P. by the addition of some butane to the $C_5+$ reformate. In this description the material boiling over the range of $C_5$ paraffin through about 400° F. is spoken of as $C_5+$ reformate product.

In the combination process of the invention the first catalytic reforming operation is carried out under conditions such that the $C_5+$ reformate product will have an octane number, research, clear of between at least about 93 and 99: these are the minimums needed at the particular quality charge naphtha. The $C_5+$ octane number may be much higher than the minimum, as required to obtain a total gasoline range reformate of the desired octane number. For example, a charge naphtha of 11.9 $K_w$ may be reformed in the first operation to 97 O.N. in order to obtain a final product reformate of about 102.

In the combination process of the invention distillation zone 27 is operated to produce three fractions which boil within the $C_5+$ reformate range. The liquid hydrocarbon product from line 26 is distilled to produce a fraction consisting essentially only of paraffins having from 5 to 6 carbon atoms i.e., pentanes and hexanes. This $C_5-C_6$ paraffin fraction is withdrawn by way of line 32 from zone 27. A second fraction is withdrawn by way of line 33 from zone 27; this second fraction contains essentially only paraffins having from 7 to 8 carbon atoms and the aromatic hydrocarbons benzene and toluene. In addition to the $C_7-C_8$ paraffins, benzene and toluene this fraction may contain some unconverted cyclo paraffins and also some overlap of hexanes, $C_9$ paraffins and xylenes. A third fraction is withdrawn by way of line 34 from zone 27; this third fraction contains essentially only paraffins having at least 9 carbon atoms and aromatic hydrocarbons having at least 8 carbon atoms, that is, this fraction contains the liquid hydrocarbons boiling from nonanes and xylenes up through about 400° F.

The second fraction is passed by way of line 33 and line 36 into a regenerative reforming operation using platinum catalyst designated zone 37. The stream leaving zone 37 is passed by way of line 38, heat exchanger 39 and line 41 into gas drum 42. A recycle hydrogen stream is passed by way of line 43, heater 44 and line 46 into line 36. The liquid hydrocarbon product from the reforming operation of zone 37 is withdrawn from gas drum 42 and is passed by way of line 48 into distillation zone 49.

The regenerative platinum reforming operation of zone 37 is carried out under conditions such that the paraffins in the charge from line 33 are dehydrocyclized into aromatic hydrocarbons; simultaneously some paraffins are hydrocracked to produce lower molecular weight paraffins and some higher boiling polymer. The operation of reforming zone 37 may be readily determined from the afore-cited "Petroleum Refiner" article on Ultraforming or any one of the references listed in "Petroleum Refiner," volume 34, No. 9, page 235, September, 1955. Under these conditions the benzene and toluene present in the second fraction from line 33 pass through without change or without significant losses.

The liquid hydrocarbon produced from the reforming of said second fraction is passed through line 48 into distillation zone 49. A wet gas stream is withdrawn from this zone 49 by way of line 51. A ($C_4$) stream is withdrawn by way of line 52 from zone 49. Polymer bottoms is withdrawn by way of line 53 from zone 49. A $C_5+$ reformate fraction is withdrawn by way of line 54 from zone 49. A portion of this material from line 54 may be withdrawn separately by way of valved line 55.

The third fraction from distillation zone 27 is passed by way of line 34 to a thermal reforming operation carried out in zone 56. The thermal reforming operation is carried out under conditions such that the nonaromatic hydrocarbons present in said third fraction are converted to olefins and some of the longer side chains on the aromatic hydrocarbons are cracked or even split off to produce lower boiling materials. Thermal reforming of naphthas is an old refining operation. Many references as to actual operation of a thermal reformer are set out in "Petroleum Refiner," volume 34, No. 9, pages 242–245, September 1955.

The liquid hydrocarbon product from the thermal reforming operation in zone 56 is passed by way of line 57 into distillation zone 58. A wet gas stream is withdrawn by way of line 59 from zone 58. A $C_4$ stream is withdrawn by way of line 61 from zone 58. A pressure tar bottoms product is withdrawn by way of line 62. The gasoline range thermal reformate product boiling over the $C_5$ to 400° F. range is withdrawn by way of line 64 from zone 58. The total stream of thermal reformate product may be withdrawn from the system by way of valved line 66.

A portion of the $C_5-C_6$ paraffin fraction from line 32 may be withdrawn from the system by way of valved line 67. In the preferred embodiment of the invention the $C_5-C_6$ paraffin fraction from line 32 is intermingled with a reformed naphtha product withdrawn by way of line 71. The $C_5+$ product of the reforming operation of zone 37 is intermingled with the $C_5-C_6$ paraffin of line 32, and with the $C_5$ to 400° F. thermal reformate product from line 64 to obtain the reformed naphtha product withdrawn by way of line 71. The reformed naphtha product is characterized by an octane number, research, clear between at least about 97 and 101.

Figure 2:
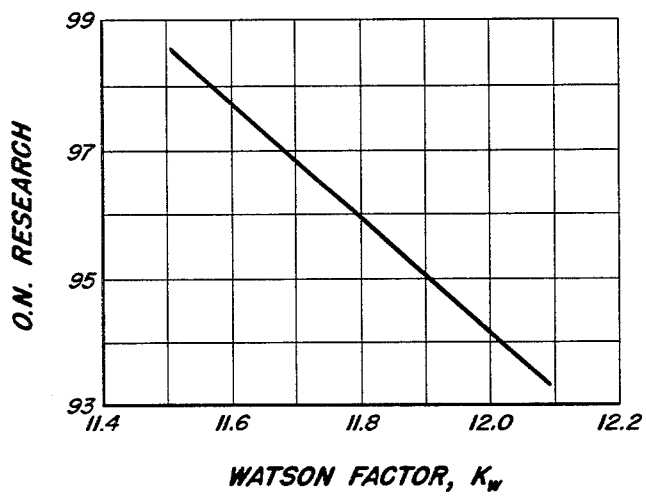
Figure 2 shows the relationship of feed stock (charge naphtha) quality and the minimum octane number, research, clear of the material in the $C_5+$ range produced in the initial catalytic reforming operation.
Figure 3:
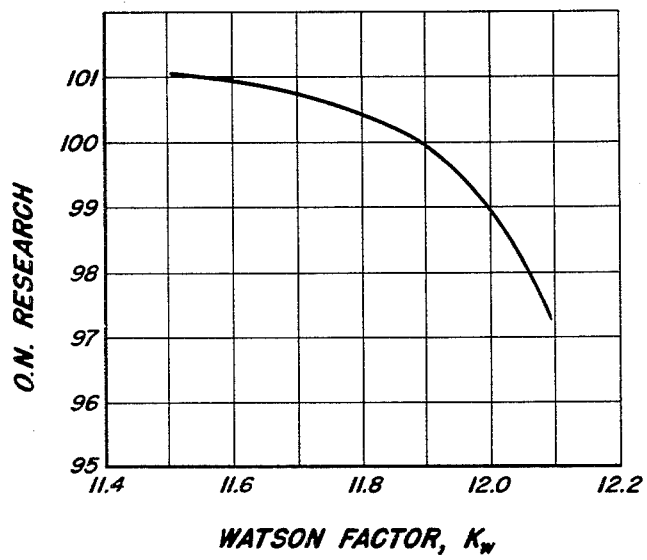
Figure 3 shows the curve setting out the relationship of charge naphtha quality and the octane number of only catalytic reforming product at which the combination process of the invention and direct catalytic reforming are at about the economic standoff point.

To illustrate the advantages obtainable by the use of the combination process of the invention Figures 2 and 3 are included in the instant disclosure. Figure 3 shows the relationship between the Watson Factor of the charged naphtha and the octane number of the $C_5+$ reformate which could be obtained by a direct regenerative reforming process using a platinum catalyst, at which octane number about economic standoff between the direct process and the combination process of the instant invention, i.e., it is more economic to use the combination process for products having an O.N. above the curve of Figure 3. A typical naphtha derived by distillation from mixed base crudes has the following characteristics: Degrees API 55; ASTM Distillation, initial, 139° F.; 10% of, 235°; 30%, 259°; 50%, 280°; 70%, 303°; 90%, 328° and max. 360°. This naphtha has a naphthene content of about 44 volume percent and a paraffin content of 48 volume percent, the Watson Characterization Factor of this naphtha is close to 11.9. By reference to Figure 3 this particular naphtha can be reformed more economically by the use of the combination reforming process of the invention at octane number, research, clear level above about 100 than it can be by high severity operation using platinum regenerative reforming only. When operating on this particular naphtha with the combination process the $C_5+$ reformate product obtainable from the first platinum reforming operation would be at least about 95 octane number, research, clear. It is to be understood that the minimum economic relationship of charged naphtha quality direct catalytically reforming alone and the combination process inherently is dependent not only on the mechanical relationship of the processes but also upon the labor situation, the value of the by-products and the cost of utilities. A further element of uncertainty is introduced by the difference between individuals who evaluate the various factors in an economic calculation. Thus the single line of Figures 2 and 3 would be more correctly represented as a band or ribbon with the single line approximately at the center thereof. It is considered that this band will have a width of, on the order of, 2 octane numbers, i.e., the actual value of the octane number may be the reading from the line plus or minus one octane unit. The term about applied to the minimum octane numbers in the description and the claims herein is intended to include the range of uncertainty referred to herein above.

By the use of the combination process of the invention it is seen from Figures 2 and 3 that the severity of operation in the platinum regenerative reforming operation may be decreased, over direct reforming alone, from at least about 2 octane units at the lower $K_w$ to at least about 4 octane units at the higher $K_w$. As the product O.N. increases over the minimums shown in Figure 3, the economic advantage tends to increase because the rate of catalyst deactivation in a direct operation increases enormously.

In addition to the above described combination process an economic advantage may be obtained over direct platinum regenerative reforming by this process. Instead of passing the second fraction from zone 27 to an independent platinum regenerative reforming zone the second fraction is cycled to the first platinum regenerative reforming zone, i.e., only one reformer is present in this combination process. In order to provide for the removal of the benzene and toluene a stream is withdrawn from line 33 in an amount such that the benzene and toluene produced are withdrawn from the system and do not build up therein. This method of operation is particularly attractive to the small refiner who has already in operation one platinum regenerative reformer and cannot justify a capital investment for a second independent unit. However, the system is also applicable to a refiner provided with two reformers, in this instance the larger portion of the second fraction may be sent to the second reformer along with the required feed naphtha to that second reforming unit. The benefits from the process being derived by combining the reformate from the second reformer with the thermal reformate and $C_5$ and $C_6$ paraffin stream from the distillation zone such as 27.

Thus, having described the invention, what is claimed is:

1. A combination reforming process comprising charging a naphtha characterized by a Watson Factor between about 11.5 and 12.1 to a regenerative reforming operation using a platinum catalyst, under conditions to produce a $C_5+$ reformate having an octane number, research, clear, between at least about 93 and at least about 99, distilling the liquid hydrocarbon product of said platinum reforming into a fraction containing essentially only of paraffins having from 5 to 6 carbon atoms, a second fraction containing essentially only of paraffins having from 7 to 8 carbon atoms, benzene and toluene, and a third fraction containing essentially only of paraffins having at least 9 carbon atoms and aromatic hydrocarbons having at least 8 carbon atoms, charging said second fraction to a regenerative reforming operation using platinum catalyst, distilling the liquid hydrocarbon produced from said second fraction to obtain a gasoline range reformate product, charging said third fraction to a thermal reforming operation, distilling the liquid hydrocarbon product from said thermal reforming to obtain a gasoline range thermal reformate product and combining said first fraction, the gasoline range reformate product, and the gasoline range thermal reformate product to obtain a reformed naphtha product characterized by an octane number, research, clear between at least about 101 and at least about 97, wherein the higher Watson Factors of the charge naphtha correspond to the lower minimum octane numbers of the reformed naphtha, and also correspond to the lower minimum octane numbers of said $C_5+$ reformate, which process is characterized by obtaining more economically a combined product having a particular octane number, research, clear than is obtainable by direct regenerative reforming of said charge naphtha, using a platinum catalyst.

2. The process of claim 1 wherein the relationship of Watson Factor, the minimum octane number of said $C_5+$ reformate and the minimum octane number of said reformed naphtha is about that expressed in Figures 2 and 3 of the drawing.

3. The process of claim 1 wherein said charge naphtha boils within the ASTM boiling range of about 175° F. and 390° F. and has a Watson Factor of between about 11.8 and 12.0.

References Cited in the file of this patent

UNITED STATES PATENTS

| | | |
|---|---|---|
| 2,304,187 | Marschner | Dec. 8, 1942 |
| 2,401,649 | Leffer | June 4, 1946 |
| 2,430,096 | Barcus | Nov. 4, 1947 |
| 2,653,175 | Davis | Sept. 22, 1953 |
| 2,710,826 | Weikart | June 14, 1955 |
| 2,743,214 | Guernsey | Apr. 24, 1956 |
| 2,758,062 | Arundale et al. | Aug. 7, 1956 |